United States Patent [19]

Parbhoo

[11] 4,309,202
[45] Jan. 5, 1982

[54] METHOD AND APPARATUS FOR FORMING AND PACKAGING MULTISTRAND ROVING

[75] Inventor: Kantilal R. Parbhoo, Reynoldsburg, Ohio

[73] Assignee: Owens-Corning Fiberglas Corporation, Toledo, Ohio

[21] Appl. No.: 137,683

[22] Filed: Apr. 7, 1980

[51] Int. Cl.³ .......................................... C03B 37/025
[52] U.S. Cl. .......................................... 65/3.1; 65/2; 65/10.1; 242/18 G
[58] Field of Search .......................... 65/2, 11 W, 12; 242/18 G

[56] References Cited

U.S. PATENT DOCUMENTS

| | | | |
|---|---|---|---|
| 3,365,145 | 1/1968 | Klink et al. | 242/166 |
| 3,371,877 | 3/1968 | Klink et al. | 242/18 G |
| 3,653,860 | 4/1972 | Smith et al. | 65/11 W |
| 4,003,731 | 1/1977 | Thompson | 65/12 |
| 4,013,435 | 3/1977 | Kane et al. | 65/11 W |
| 4,141,709 | 2/1979 | Reese | 65/2 |

Primary Examiner—Robert L. Lindsay, Jr.
Attorney, Agent, or Firm—Ronald C. Hudgens; Kenneth H. Wetmore; Harry O. Ernsberger

[57] ABSTRACT

The disclosure embraces a method of and apparatus for processing fibers or filaments of glass or other fiber-forming material into a roving and packaging the roving, the fibers or filaments during advancement being initially separated or segregated into strands or linear groups of fibers or filaments by fine streams or jets of air or other gas, maintaining the strands in separated condition by a guide, converging the separated strands into a roving and winding the roving into a package.

14 Claims, 11 Drawing Figures

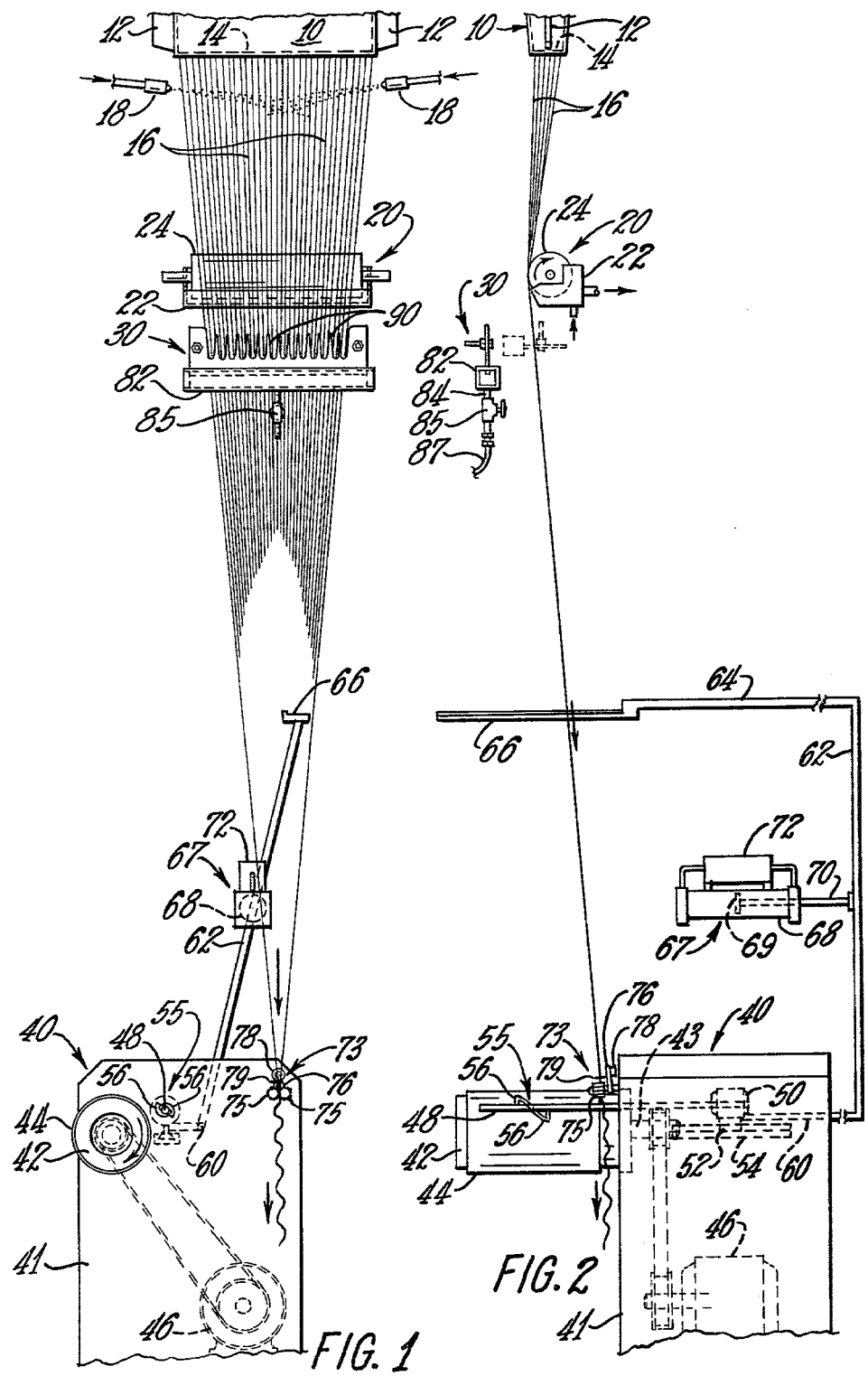

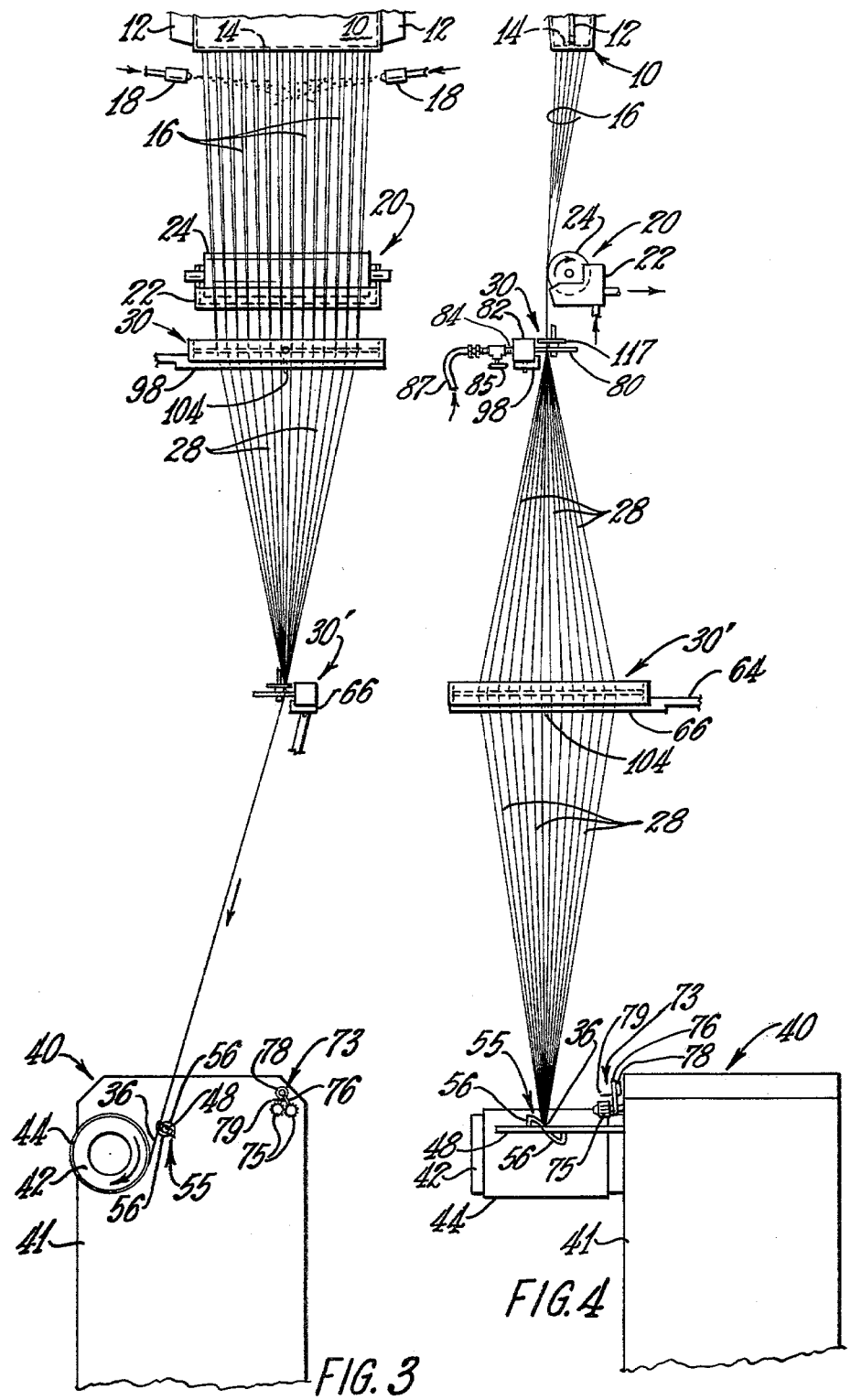

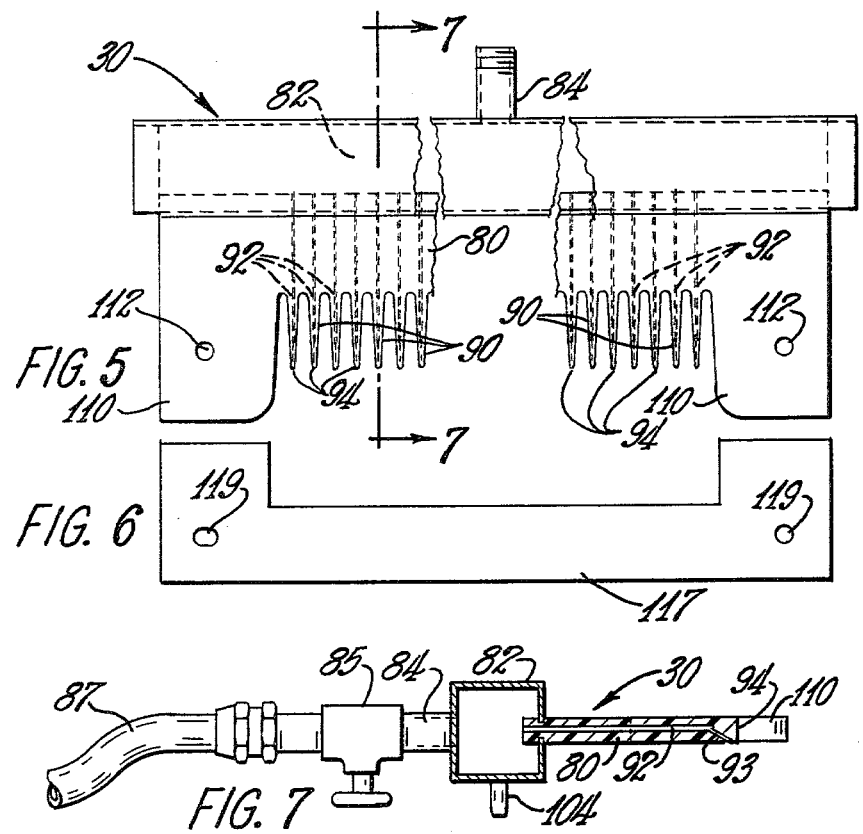
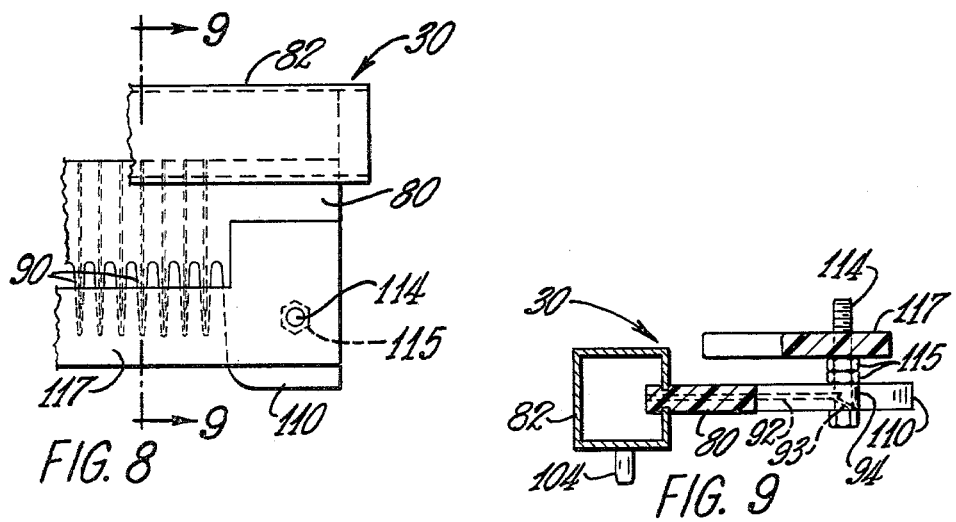

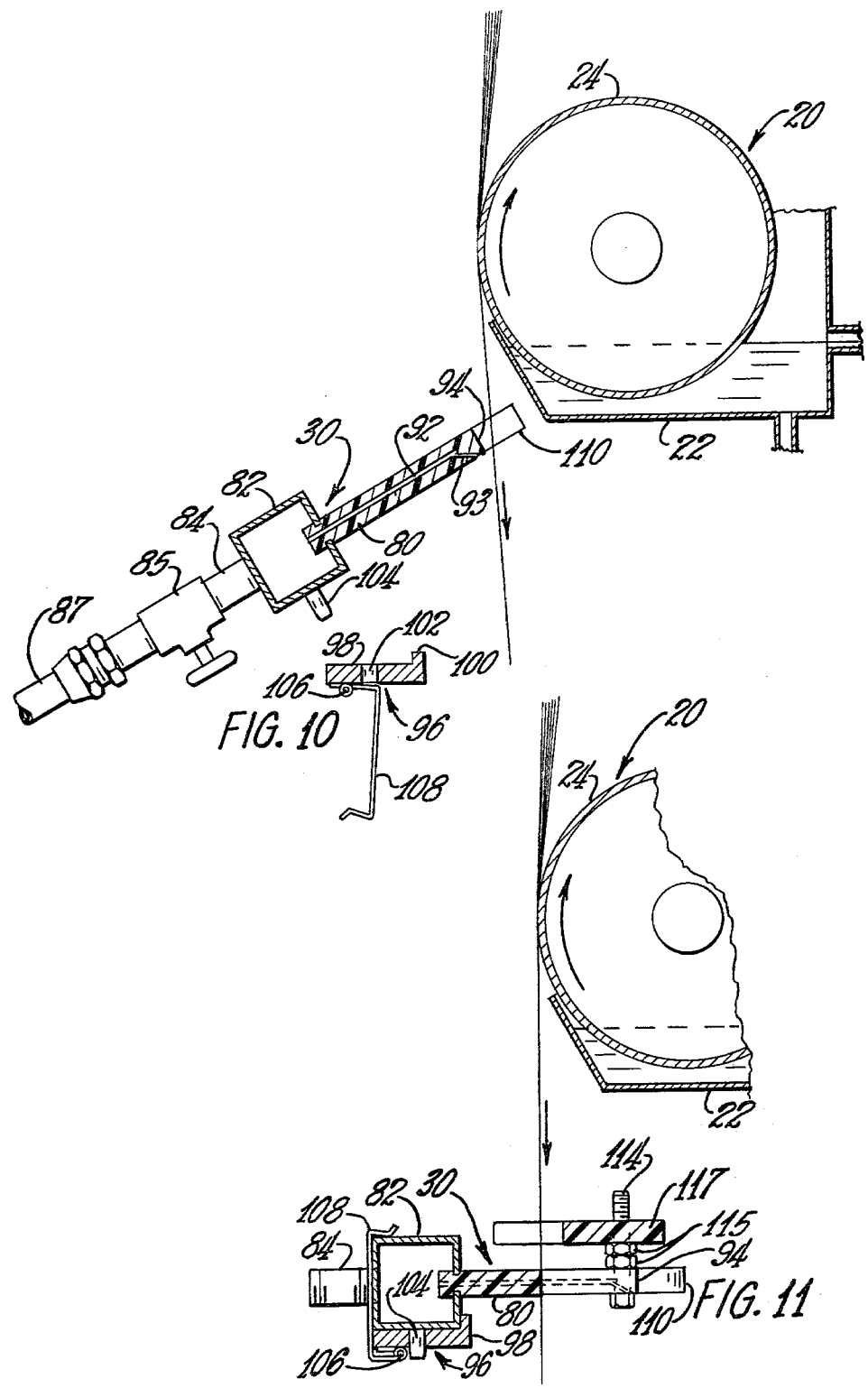

METHOD AND APPARATUS FOR FORMING AND PACKAGING MULTISTRAND ROVING

TECHNICAL FIELD

This invention relates to forming multistrand roving of filaments or fibers of glass or other fiber-forming material and separating or segregating the fibers or filaments into linear groups or strands and winding a roving comprising the groups or strands into a package.

BACKGROUND ART

Developments have been made in forming and packaging multistrand roving of glass fibers or filaments but difficulties have been encountered in maintaining the strands of fibers or filaments from crisscrossing when they have been separated into linear strands or groups by a splitting comb-like shoe and breakage of the filaments is encountered when certain filaments are engaged by the tip portions of the projections or teeth of the splitting shoe. Such difficulties interrupt the attenuation of glass streams to fibers and substantial downtime is required in restarting the processing operations. U.S. patents to Klink et al U.S. Pat. Nos. 3,365,145 and 3,371,877 are examples of methods and apparatus in forming multistrand rovings of glass fibers or filaments wherein the glass fibers or filaments are directly attenuated from glass streams flowing from a glass stream feeder or bushing. U.S. Pat. No. 3,365,145 discloses a method and apparatus wherein streams of glass flowing from orifices of a stream feeder or bushing are attenuated into continuous fibers or filaments by winding a roving of the fibers or filaments into a package. The filaments of the group are engaged with an applicator and size or coating material transferred onto the filaments. At a region below the applicator the filaments are separated or segregated into groups or strands of filaments by teeth or projections of a comb-like guide, the groups of strands forming a roving. The roving is traversed lengthwise of a winding machine collet wherein the strands forming the roving are maintained in side-by-side relation in band-like formation as the roving is wound into a package. Arranged adjacent each end of the package is a pin engaged by the strands of the roving which pins compact the strands so that a square end package of roving is formed.

U.S. Pat. No. 3,371,877 discloses a method and apparatus for attenuating streams of glass into fibers or filaments and winding a roving of the fibers or filaments into a package which method and apparatus are similar to that disclosed in U.S. Pat. No. 3,365, 145. In U.S. Pat. No. 3,371,877 the attenuated filaments are engaged with an applicator and size or coating material transferred onto the filaments. At a region below the applicator, the filaments are separated or segregated into groups of filaments or strands by teeth or projections of a comb-like guide. Disposed below the first guide is a second comb-like guide having teeth or projections spaced to accommodate the strands separated by the first guide. The second comb-like guide is disposed so as to divert the strands through substantially ninety degrees. The multistrand roving is then wound into a package whereby the strands are maintained in side-by-side relation throughout the package. Arranged adjacent each end of the package is an abutment engaged by the roving which abutments compact the strands whereby a square end package of roving is formed.

In these known methods of separating attenuated filaments of glass or like materials a comb-like guide having a series of spaced projections or teeth is manually used by an operator for splitting or separating the filaments into strands in forming a roving.

DISCLOSURE OF THE INVENTION

The present invention involves a method of and apparatus for attenuating streams of glass or other fiber-forming material into fibers or filaments which method and apparatus include segregating or separating a fan-like group of attenuated fibers or filaments into a plurality of strands or linear groups in a manner which provides for a more uniform number of fibers or filaments in each strand and wherein breakage of fibers or filaments is substantially eliminated and the liability of crisscrossing of fibers or filaments from one strand or group to another strand or group is practically eliminated.

An object of the invention is the provision of a method of and apparatus for forming multistrand roving from attenuated fibers or filaments of glass or other fiber-forming material wherein a comb-like guide or implement is utilized for segregating or separating filaments into groups or strands wherein very fine streams or jets of air or other gas provide air lances utilized in association with the guide or implement wherein the air streams, jets or air lances engage a fan of fibers or filaments to initiate separation or segregating of the fibers or filaments into strands in advance of engagement of the guide or implement with the fibers or filaments whereby filament breakage and crisscrossing of the filaments are substantially eliminated as well as promoting a more uniform number of fibers or filaments in each of the strands or linear groups of fibers or filaments of the roving.

An object of the invention is the provision of a method of and apparatus for forming multistrand roving from attenuated fibers or filaments of glass or other fiber-forming material wherein a large number of streams of glass or other heat-softenable fiber-forming material is attenuated into continuous filaments by winding a roving of the filaments into a package wherein the attenuated filaments are engaged by fine streams or jets of gas such as air whereby the advancing filaments are separated into strands, and engaging the strands by a guide equipped with projections extending between adjacent strands for maintaining the strands in spaced relation at a region prior to converging the strands into a roving which is wound into a package.

Another object of the invention resides in the provision of a first comb-like guide utilized for separating or segregating filaments or fibers into groups of strands wherein very fine streams or jets of air or air lances are utilized in association with the comb-like guide wherein the air or gas streams or jets initiate separating of the fibers or filaments into strands or linear groups in advance of engagement of the first comb-like guide with the strands or groups, and a second comb-like guide engaged with the strands or groups below the first guide, the second guide diverting the strands or groups through substantially ninety degrees and synchronizing movement of the second comb-like guide with movement of a traverse means for distributing the roving lengthwise of a package during formation of the package.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings.

BRIEF DESCRIPTION OF THE DRAWINGS

The details of the invention will be described in connection with the accompanying drawings in which:

FIG. 1 is a front elevational view of an apparatus for carrying out the method of forming and packaging multistrand roving, the figure illustrating an arrangement for segregating the filaments into strands;

FIG. 2 is a side elevational view of the apparatus illustrated in FIG. 1;

FIG. 3 is a view similar to FIG. 1 illustrating the use of means diverting the strands through approximately ninety degrees;

FIG. 4 is a side view of the arrangement illustrated in FIG. 3;

FIG. 5 is a plan view of a guide arrangement including tubular means for discharging fine streams of gas for separating a fan-shaped group of filaments into strands for forming a roving;

FIG. 6 is a plan view of a guard member for use with the arrangement shown in FIG. 5 for maintaining the segregated strands in spaced relation;

FIG. 7 is a partial sectional view taken substantially on the line 7—7 of FIG. 5;

FIG. 8 is a fragmentary view illustrating portions of the constructions shown in FIGS. 5 and 6 in assembled relation;

FIG. 9 is a sectional view taken substantially on the line 9—9 of FIG. 8;

FIG. 10 is a sectional view illustrating a method of engaging the filament-separating means shown in FIG. 7 with a group of filaments at a region beneath a filament coating applicator, and FIG. 11 is a view illustrating the filament segregating or separating means in filament-engaging position;

BEST MODE FOR CARRYING OUT THE INVENTION

While the method and apparatus of the invention are particularly usable for processing fibers or filaments of heat-softened mineral material, such as glass, and producing multistrand roving of the filaments and packaging the roving, it is to be understood that the method and apparatus may be utilized for forming and packaging roving formed of filaments of other filament-forming materials.

Referring initially to FIGS. 1 through 4 of the drawings, there is illustrated a bushing or stream feeder 10 containing a supply of heat-softened glass or other filament-forming material. Where the filament-forming material is glass, the feeder 10 may be connected with a forehearth (not shown) supplied with softened glass from a furnace or the glass may be reduced to heat-softened condition in a melter or other means connected with the feeder.

The feeder or bushing 10 is provided at its ends with terminal lugs 12 adapted to be connected with a source of electric energy for supplying heat to the material in the bushing to maintain the material at a proper temperature and viscosity for forming fibers or filaments.

The floor section 14 of the feeder is provided with a large number of orifices or openings for flowing streams of the glass or other fiber-forming material from the feeder. The glass streams are attenuated into individual filaments 16 by winding a roving of the filaments into a package as hereinafter described.

Nozzles 18 may be provided for delivering sprays of water onto the newly formed filaments. The filaments 16 are advanced as a group into engagement with an applicator 20 for applying size or coating material onto the filaments. The applicator comprises a housing 22 in which is rotated an applicator roll or member 24 partially immersed in size or coating material contained in the housing 22 for transferring the size or coating material to the filaments through wiping action of the filaments engaging a film of the sizing or coating material on the applicator, roll or member 24.

In forming the roving of the filaments 16, it is desirable to segregate or separate the filaments into strands or linear groups 28 (shown in FIGS. 3 and 4) and the arrangement is inclusive of a novel method and means for separating or segregating the filaments into a substantial number of strands. In applicant's arrangement the filaments 16 are segregated or separated into strands or linear groups 28 of filaments at a region just below the applicator 20.

The segregating or the filament separating arrangement or primary guide shoe 30 comprises an implement or guide shoe in association with means providing very fine jets or streams of gas such as compressed air, referred to herein as air lances, this arrangement being hereinafter described in detail. The arrangement 30 is shown in FIGS. 1 and 2 in an out-of-use position and is illustrated in FIGS. 3 and 4 in a position of use in segregating, separating and guiding the filaments into linear groups or strands 28.

In forming the roving a secondary or second guide arrangement 30', shown in FIGS. 3 and 4, is engaged with the separated strands at a region below the first guide arrangement 30, the second guide arrangement being disposed to divert the strands through substantially ninety degrees, one of the purposes of the secondary or second guide arrangement 30' being to reduce the tendency of the strands to "whip" under the influence of traverse movements by reason of the rapid traversing of the roving as the roving is wound into a package. The second guide shoe arrangement 30' may be of the same construction as the first guide shoe arrangement 30 but without the compressed air connections as the strands 28 have been separated and spaced by the first guide shoe arrangement 30.

The strands 28 are converged into a roving 36 by a traversing means adjacent the region of winding the roving into a package. The roving 36 comprising the plurality of linear groups or strands 28 of filaments is collected into a wound package by a winding machine or apparatus 40. The winding apparatus or machine 40 is inclusive of a housing 41. Journaled in the housing 41 is a rotatable winding collet 42 mounted on a shaft 43. Telescoped on the collet 42 is a forming tube or tubular sleeve 44 on which the roving is collected in a package.

The collet 42 and shaft 43 are rotated by a motor 46 which is controlled by an operator and its speed programmed during package winding in a conventional manner so that the filaments are attenuated at a substantially constant speed. Means are provided for traversing the roving during winding of the package for distributing the roving lengthwise of the package. The traversing mechanism illustrated includes a traverse shaft 48, the traverse shaft being rotated by a motor 50 contained within the housing 40.

The motor 50 and the traversing shaft 48 are mounted on a support 52 which is adapted for reciprocating motion in a stationary trackway or other mounting means 54 in a direction parallel with the axis of rotation of the traversing shaft. The traversing movement of the roving 36 is under the direct control of a traversing means 55 comprising a pair of substantially spirally-shaped complementary cam members 56 mounted upon the shaft 48 as shown in FIGS. 1 through 4. The cam members 56 may be fashioned of steel or other suitable material. This form of traverse means is disclosed and described in the patent to Beach U.S. Pat. No. 2,391,870.

Secured to the housing of the motor 50 or its supporting base is a member 60 having an upwardly extending portion 62 and a laterally extending portion 64 shown in FIGS. 1 and 2. The portion 64 has an offset extension or pad portion 66 which is adapted to support the lowermost or secondary strand guide 30' in the manner shown in FIGS. 3 and 4. Means is provided for reciprocating the traverse motor 50 and the structural members supporting the pad 66 which carries the secondary strand guide member or lower guide shoe 30'.

As illustrated in FIGS. 1 and 2, the motive means 67 for reciprocating these components may comprise a cylinder 68 in which is mounted a reciprocable piston 69 mounted on a piston rod 70 connected with the upwardly extending member 62. The piston 69 is actuated in alternate directions by compressed air which is controlled by suitable conventional solenoid operated valve means 72 for reciprocating the motor 50, the traverse shaft and traverse mechanism and the members, 60, 62, 64 and 66 to traverse the secondary or lower strand guide or shoe 30' in synchronous relation with the reciprocable movements of the traverse shaft 48 and traverse means 55 to distribute the roving 36 lengthwise of the package, the traverse means effecting crossings of the roving in forming the package.

Means is provided for continuing stand-by attenuation of the glass streams to filaments during periods of start-up and during periods wherein a completed package of roving is being removed from the winding collet and an empty forming tube placed on the collet. A means of this character for advancing the filaments when the roving is not being wound into a package is illustrated in FIGS. 1 through 4. Apparatus 73 mounted by the housing 41 is provided for this purpose.

The arrangement or apparatus 73 comprises two pull rolls 75 mounted on shafts, one of which is driven by a small motor (not shown), the other roll being driven from the first one through intermeshing teeth on the pull rolls. The pull roll not connected with the motor is mounted upon a member 76 associated with a housing 78 in which is contained a coil spring which urges the pull roll carried by the member 76 into engagement with the motor driven pull roll. The pull rolls are driven at a speed somewhat slower than normal attenuation speed to avoid interruption of attenuation of the filaments and to facilitate the start of a package by the operator.

Secured to the journal means supporting one of the pull rolls 75 is a wire hook or guide eye 79 in which the roving is engaged by the operator to hold the roving in engagement with the pull rolls during start-up or during package removing operations so that attenuation is continued on the filaments of the roving by rotation of the pull rolls. The pull roll arrangement is preferably of the character disclosed in the patent to Jackson U.S. Pat. No. 4,050,639.

The bundle of filaments constituting the roving is engaged with the pull rolls 75 so that the glass streams are being attenuated to filaments before the filaments are separated or segregated into strands or separate linear bundles by the guide shoe arrangements 30 and 30'. The components of the filament separating and segregating arrangement are illustrated in detail in FIGS. 5 through 11.

Before the filaments are separated into strands by the segregating or separating arrangement 30, the bundle of filaments is engaged with the rotating pull rolls 75 of the assemblage or apparatus 73 which provides the filament attenuating means before winding of a package of roving is begun. As shown in FIG. 1, during initial start-up the bundle of filaments is engaged by the operator with the pull rolls and the segregating or separating apparatus or arrangement 30 is out of engagement with the filaments.

With particular reference to FIGS. 5 through 9, the primary filament separating or segregating arrangement or apparatus 30 is inclusive of a member, guide or guide shoe 80 connected with a manifold 82 which is supplied with compressed air or other gas. The manifold, as shown in FIGS. 2, 4, 5 and 10, is connected by a tubular member 84 with a valve means or valve 85, the valve 85 being connected by tubular means 87 with a source of compressed air or other gas. The valve means 85 is provided for controlling flow of compressed air into the manifold 82.

The guide shoe 80 is provided with a plurality of teeth or projections 90, the projections resembling the teeth of a comb. Each of the projections 90 is provided with a drilled passage or channel 92, the diameter of the passages or channels 92 being very fine or minute. Each channel or passage 92 is in communication with an angular channel or nozzle 93 which may be of smaller diameter or size than the channels or passages 92, the angular channels or nozzles 93 opening into the atmosphere at the region of the tips 94 of the projections 90.

The channels or passages 93 are of very small or minute diameters so that each opening 93 delivers needle-like gas or air streams, jets or air lances which initially separate, segregate or split the fan-like group of filaments 16 at a region below the applicator 20, as shown in FIG. 10, into linear groups or strands 28. It has been found preferable to have the air exit passages or nozzles 93 angularly arranged with respect to the lengthwise axes of the projections 90 to better facilitate engagement of the strand separating and guide apparatus 30 with the strands in the manner illustrated in FIG. 10.

It is to be understood that the air passages or nozzles 93 may exit through the tips of the projections in which event each exit passage 93 would be axially aligned with the passage or channel 92 in a projection.

When an operator engages the primary guide shoe 80 with the filaments moving away from the applicator 20, the projections 90 are open so that as the air lances or air streams from the air passages or nozzles 93 split, separate and segregate the filaments into strands, and the projections 90 engage and maintain the strands or linear groups of filaments in separated or spaced relation at the region of the guide shoe 30.

Means is provided for supporting the guide shoe 30 in an operative position for guiding the strands after engagement of the guide projections 90 with the strands. A form of support means 96 is shown in FIG. 10 and embodies a support member 98 fixed upon a supporting structure (not shown). The support member 98 may be provided with a raised portion or ridge 100 for engagement with a side wall of the manifold 82 of the guide shoe 30 when the manifold is in engagement with and supported by the member 98.

The support member 98 may be provided with an opening 102 which receives a pin or projection 104 on the manifold 82, the shoe 30 being illustrated in supported position in FIG. 11 with the manifold mounted upon the support member 98 with the raised portion engaging an outer wall of the manifold and the pin 104 engaged in the opening 102 in the support member 98. Pivotally supported by a pintle or pivot pin 106 carried by the support member 98 is a catch or latch member 108 which is swung into latching engagement with the manifold 82, as illustrated in FIG. 11, to secure the guide shoe 30 to the support member 98.

The strand guide shoe member 80 is provided with means to support a guard or member to maintain the strands in the spaces between adjacent projections 90 on the guide shoe during the operation of winding a roving into a package. Referring to FIGS. 5, 6, 8 and 9 the end regions of the member 80 beyond the ends of the rows of projections 90 are fashioned with extensions or lug portions 110 extending in substantial parallelism with the projections.

Each of the extensions 110 is provided with an opening 112 which receives a headed bolt 114. The headed bolts 114 are retained in the openings 112 in the extensions by means of threaded nuts 115. The bolts 114 extend upwardly from the extensions 110 in the manner illustrated in FIG. 9. A guard or member 117 is provided for maintaining the strands or separated groups of filaments in the spaces between adjacent projections 90 during winding of the strands into a roving. The guard or member 117 is provided with openings 119 which are spaced so as to receive the upwardly extending portions of the bolts 114 in the manner illustrated in FIGS. 8 and 9.

After the operator engages the projections 90 on the guide or guide shoe member 80 with the strands and manually positions the guide shoe on the support 98 in the manner shown in FIG. 11, the operator assembles the guard or member 117 on the upwardly extending bolts 114 in the position illustrated in FIGS. 9 and 11 to thereby maintain the advancing strands in the spaces between adjacent projections 90 during formation of a roving.

The number of filaments attenuated from glass streams flowing from orifices in the bushing or feeder 10 may be substantial and upwards of about twelve thousand filaments. The attenuated filaments or fibers may be of diameters in a range of about fifteen hundred thousandths of an inch and thirty-five hundred thousandths of an inch. Filaments of a diameter of about twenty hundred thousandths of an inch are preferred.

The strands or linear groups 28 of the filaments are untwisted and each strand of the roving comprises about two hundred continuous filaments or fibers. Where twelve thousand filaments are separated into strands, there would be about sixty strands or linear groups 28.

Through the use of the air streams or air lances initially separating the filaments 16 into strands a number of strands up to about sixty may be formed without liability of breakage of filaments because the air streams or air lances separate the filaments into strands or linear groups in advance of engagement of the projections 90 with the separated or segregated strands.

The air streams or air lances are under pressure to provide velocities of the air streams or air lances just sufficient to split or separate the filaments into the linear groups or strands, the velocity of the streams being low enough so that the air streams or air lances do not cause fracture of the filaments.

The lower or secondary guide shoe arrangement 30' is substantially the same in all major respects as the upper or primary guide shoe arrangement 30 except that the connections for conveying compressed air are omitted from the arrangement as the strands are already spaced by engagement of the upper strand guide arrangement 30.

The air conveying channels or passages 92 of the primary guide shoe arrangement 30 may be of sufficient size to convey air from the manifold 82 to the air delivery angular passages or nozzles 93. It has been found that a drilled passage 92 of about thirty-one thousandths of an inch in diameter is usually sufficient but this passage may be of a lesser or greater diameter if desired.

It is preferable that the air delivery passages or nozzles 93 be of very small diameter so that the streams of air delivered therefrom are very fine and provide air lances for separating the fibers or filaments into strands or linear bundles.

The air delivery passages or nozzles 93 may be of diameters of from about sixteen thousandths of an inch to twenty-four thousandths of an inch and it has been found that air exit passages of about twenty-one thousandths of an inch provide satisfactory air lances or streams for separating or segregating the filaments into strands of filaments.

It is to be understood that the air delivery passages or nozzles 93 may be aligned continuations of the passages 92 whereby the air streams would exit from the tips of the teeth or projections 90. However, it has been found that as the operator tends to engage the guide shoe arrangement 30 with the fan-like group of filaments in an angular position as illustrated in FIG. 10, it is desirable that the air delivery exits 93 be angularly arranged with respect to the axis of the projections and passages 92.

As the air streams or air lances are very fine, they tend to separate the filaments so that substantially an equal number of filaments is contained in each of the strands. Through the use of the fine air streams or air lances in initially separating the filaments into strands, none of the filaments will be broken by reason of engagement of tips 94 of the projections with any filaments because they are already separated by the air lances.

When both guide shoe arrangements 30 and 30' are engaged with the strands and the guards 117 are in place, the strands of filaments will be maintained intact so that they may be readily converged into the roving 36.

The operations and functions of negotiating start-up and operation of the apparatus are as follows: An operator manually gathers the filaments falling from the streams of glass by gravity and pulls them downwardly converging them manually into a group. The filaments are in side-by-side relation and engage the applicator roll 24 and receive a coating or size or other material from the coating or size on the roll.

The operator then manually converges the filaments into a linear group and engages the group with the guide eye 79 and guides the group of filaments through the pull rolls 75, the guide eye maintaining the group in engagement with the rotating pull rolls until the winding of a package is initiated. The pull rolls attenuate the streams to filaments at a much lower than normal attenuating speed.

The operator then manually moves the primary guide shoe arrangement 30 from an out-of-use position, shown in FIG. 2, into an initial angular position of use of the guide shoe illustrated in FIG. 10. With the guide shoe arrangement 30 manually held in the position shown in FIG. 10, the air streams, jets or air lances delivered from the angular air delivery passages or nozzles 93 engage the fan of filaments illustrated in FIG. 1, the air streams or air lances separating the fan of filaments into several strands 28, the number depending upon the number of projections 92 and air delivery passages or nozzles 93.

The operator then manipulates the guide shoe arrangement 30, shown in FIG. 10, to a horizontal position, shown in FIG. 11, wherein the manifold 82 is mounted upon the support or member 98 and the pin 104 engaged in the opening 102 to properly maintain the guide shoe arrangement 30 in strand-guiding position. With the guide shoe arrangement 30 mounted in a horizontal position, as shown in FIGS. 4 and 11, the strands are moving through the spaces between adjacent projections 90. To maintain the guide shoe arrangement 30 in position on the support member 98, the hook member 108 may be latched into engagement with the manifold 82 in the manner illustrated in FIG. 11.

With reference to FIGS. 5, 6, 8, 9 and 11, the operator places the guard 117 in a position, shown in FIG. 8, and moves the guard downwardly whereby the upwardly extending portions of the bolts 114 enter the openings 119 in the guard whereby the guard is maintained in a position as illustrated in FIGS. 8, 9 and 11. In this position of the guard 117 on the primary guide shoe arrangement 30, the strands or linear groups 28 of filaments are in the spaces between adjacent projections 90 and are maintained in the spaces by the guard 117.

The operator then engages the projections of the secondary guide shoe arrangement 30' into the spaces between the strands at a region immediately below the primary guide shoe arrangement 30. The operator then affixes a guard 117 in proper position on the guide shoe arrangement 30' so that the strands 28 are maintained in the spaces between the projections on the guide shoe arrangement 30'. The operator then manually moves the secondary guide shoe arrangement 30' downwardly away from the primary guide shoe arrangement 30 and turns or rotates the secondary guide shoe arrangement 30' through ninety degrees and mounts the secondary guide shoe arrangement 30' on the extension or pad 66 of member 64.

During these operations the filaments of all of the strands are being advanced by the pull rolls 75. The operator then grasps the filaments just above the pull rolls 75 and initiates rotations of the collet 42 at a comparatively slow speed. The operator then manually winds a few turns of the roving 36 of the filaments on the end of the collet 42, the operator at the same time severing the roving just above the pull rolls 75 and manually engages the roving with the traverse means 55 increasing the speed of rotation of the collet 42 and energizes the motor 50 rotating the traverse means and initiates reciprocation of the piston 69 in the cylinder 68 to set up reciprocation of the traverse means 55 and member 64 carrying the secondary guide shoe arrangement 30'

As the collet 42 is brought up to winding speed, the traverse means 55 and the secondary guide shoe arrangement 30' are reciprocated by the reciprocating means 67 whereby the roving 36 is traversed by the traverse means 55 and package winding thus begun on the forming tube 44 mounted on the collet 42.

When a package has been completed on the collet 42, the operator severs the roving adjacent the package as the package is brought to rest and inserts the roving in engagement with the pull rolls 75 so as to continue attenuation of the filaments at a reduced speed during the period that the operator removes the collected package from the collet, inserts an empty forming tube on the collet and initiates the start of winding of a succeeding package as hereinabove described.

It is apparent that, within the scope of the invention, modifications and different arrangements may be made other than as herein disclosed, and the present disclosure is illustrative merely, the invention comprehending all variations thereof.

I claim:

1. The method of forming and packaging a roving comprising a plurality of continuous filaments including advancing the filaments by winding a roving of strands of the filaments into a package, applying coating material to the filaments by an applicator, engaging a plurality of spaced streams of gas with the coated filaments immediately below the applicator, separating the coated filaments into a plurality of strands by the streams of gas, converging the strands into a roving, and traversing the roving to distribute the roving lengthwise of the package.

2. The method of forming and packaging a roving comprising a plurality of continuous filaments of glass including advancing the filaments by winding a roving of strands of the filaments upon a rotating collector into a package, applying coating material to the filaments by an applicator, engaging a plurality of spaced streams of gas with the coated filaments immediately before the applicator, separating the coated filaments of glass into a plurality of strands by the streams of gas, converging the strands into a roving, and traversing the roving to distribute the roving lengthwise of the package.

3. The method of forming and packaging a roving comprising a plurality of continuous filaments including advancing the filaments by winding a roving of strands of the filaments upon a rotating collector into a package, applying coating material to the filaments, engaging a plurality of spaced streams of gas with the coated filaments, separating the coated filaments into a plurality of strands by the streams of gas, maintaining the strands in separated condition by a guide for a short distance of their advancement, converging the strands into a roving, and traversing the roving to distribute the roving lengthwise of the package.

4. The method of packaging a roving comprising a plurality of continuous filaments including advancing the filaments by winding a roving of strands of the filaments upon a rotating collector into a package, applying coating material to the filaments, engaging a plurality of jets of gas with the coated filaments, separating the coated filaments into a plurality of strands by the jets of gas, engaging the strands with a guide having projections separating the strands, converging the strands into a roving, and traversing the roving to distribute the roving lengthwise of the package.

5. The method of packaging a roving comprising a plurality of continuous filaments of glass including advancing the filaments by winding a roving of strands of the filaments upon a rotating collector into a package, applying coating material to the filaments, engaging a plurality of jets of gas with the coated filaments, separating the coated filaments of glass into a plurality of strands by the jets of gas, engaging the strands with a guide having projections separating the strands, converging the strands into a roving, and traversing the roving to distribute the roving lengthwise of the package.

6. The method of forming and packaging a roving comprising a plurality of continuous filaments including advancing the filaments by winding a roving of strands of the filaments upon a rotating collector into a package, applying coating material to the filaments, engaging a plurality of spaced jets of gas from orifices in a guide with the coated filaments, separating the coated filaments into a plurality of strands by the jets of gas, moving the guide having spaced projections to a position wherein the projections maintain the strands in separated relation, converging the strands below the guide into a roving, and traversing the roving to distribute the roving lengthwise of the package.

7. The method of forming and packaging a roving comprising a plurality of continuous filaments of glass including flowing streams of glass from a feeder, attenuating the streams of glass to filaments by winding a roving of strands of the filaments upon a rotating collector into a package, applying coating material to the filaments, engaging spaced jets of gas with the coated filaments, separating the coated filaments into a plurality of strands by the jets of gas, engaging the strands of coated filaments in spaces between adjacent projections on a guide for maintaining the strands in separated condition, converging the strands below the guide into a roving, and traversing the roving to distribute the roving lengthwise of the package.

8. The method of forming and packaging a roving including flowing streams of heat-softened glass from a supply, attenuating the streams into continuous filaments by winding a roving of strands of the filaments upon a rotating collector into a package, applying coating material to the filaments, manipulating a guide having channels delivering streams of gas to a position wherein the streams of gas engage and segregate the coated filaments into a plurality of strands, engaging the separated strands in spaces provided in the guide, moving the guide to a position maintaining the strands in the spaces in the guide, converging the strands into a roving, and traversing the roving to distribute the roving lengthwise of the package during winding of the roving into a package.

9. The method of packaging a roving comprising a plurality of continuous filaments including advancing the filaments by winding a roving of strands of the filaments upon a rotating collector into a package, applying coating material to the filaments, engaging a plurality of jets of gas with the coated filaments, separating the coated filaments into a plurality of strands by the jets of gas, engaging the strands with a first guide having projections separating the strands, engaging the separated strands with a second guide having projections maintaining the strands in separated relation, the second guide diverting the strands through ninety degrees, converging the diverted strands into a roving, and traversing the roving to distribute the roving lengthwise of the package.

10. The method of forming and packaging a roving including flowing streams of heat-softened glass from a supply, attenuating the streams into continuous filaments by winding a roving of strands of the filaments upon a rotating collector into a package, manipulating a first guide having channels delivering streams of gas to a position in which the streams of gas engage and segregate the attenuated filaments into a plurality of strands, engaging the separated strands in spaces defined by projections provided by the guide, moving the guide to a position maintaining the strands in the spaces in the guide member, engaging a second guide with the separated strands whereby the strands are disposed in spaces defined by projections provided on the second guide, disposing the second guide in a position diverting the strands through substantially ninety degrees while maintaining the strands in separated relation, converging the strands from the second guide into a roving, and traversing the roving and the second guide to distribute the roving lengthwise of the package during winding of the roving into a package.

11. Apparatus for separating advancing filaments into strands in forming a roving of the strands comprising, in combination, a strand guide arrangement including a guide shoe formed with a plurality of spaced projections, a manifold secured to the guide shoe, said manifold adapted to be connected with a source of gas under pressure, said projections having channels lengthwise therein and terminating in discharge nozzles, said guide shoe being adapted to be positioned whereby streams of gas from the nozzles initially separate the advancing filaments into strands with a plurality of filaments in each strand, said guide shoe being movable onto a support whereby the strands are engaged in the spaces provided by the projections, and a guard member mounted by the guide shoe for maintaining the strands in the spaces provided by the projections, a rotating collector upon which a roving of the strands is wound into a package, and a traverse means converging the strands into a roving and distributing the roving lengthwise of the package.

12. Apparatus for separating advancing filaments into strands in forming a roving of the strands comprising, in combination, a strand guide arrangement including a guide shoe formed with a plurality of spaced projections, a manifold secured to the guide shoe, said manifold adapted to be connected with a source of compressed air, said projections having air channels lengthwise therein and terminating in air discharge nozzles angularly arranged with respect to the channels in the projections, said guide shoe being adapted to be positioned whereby streams of compressed air from the nozzles initially separate the advancing filaments into strands with a plurality of filaments in each strand, said guide shoe being movable onto a support whereby the strands are engaged in the spaces provided by the projections, a guard member mounted by the guide shoe for maintaining the strands in the spaces provided by the projections, a rotating collector upon which a roving of the strands is wound into a package, and a traverse means converging the strands into a roving and distributing the roving lengthwise of the package.

13. Apparatus for separating advancing filaments into strands in forming a roving of the strands comprising, in combination, a strand guide arrangement including a guide formed with a plurality of spaced projections, a manifold secured to the guide, said manifold adapted to be connected with a source of compressed air, said projections having air channels lengthwise therein, said air channels terminating in air discharge nozzles angularly arranged with respect to the channels in the projections, said angularly disposed discharge nozzles discharging streams of air at regions adjacent and slightly rearwardly of the tips of the projections, said guide being adapted to be positioned whereby the streams of compressed air from the nozzles initially separate the advancing filaments into strands with a plurality of filaments in each strand, said guide being movable onto a support whereby the strands are engaged in the spaces provided by the projections, a guard member mounted by the guide for maintaining the strands in the spaces provided by the projections, a rotating collector upon which a roving of the strands is wound into a package, and a traverse means converging the strands into a roving and distributing the roving lengthwise of the package.

14. Apparatus for forming and packaging a roving of filaments of glass formed from streams of heat-softened glass from a feeder, said streams being attenuated into filaments by winding a roving of strands of the filaments into a package, an applicator roll engaging the attenuated filaments for providing a coating on the filaments, means for separating filaments moving away from the applicator roll into separate strands, each strand comprising a plurality of filaments, said separating means including a primary comb-like guide having spaced projections, said projections having channels terminating in nozzles adjacent the tips of the projections, a manifold connected with the projections, means for connecting the manifold with a supply of compressed air, the compressed air being projected from the nozzles in fine streams for separating the filaments into strands, said primary comb-like guide being movable to a position after separation of the filaments into strands whereby the strands are arranged in spaced relation by the projections, a guard member on the primary guide for maintaining the strands in spaced relation by the projections, a secondary guide having projections accommodating the spaced strands, said secondary guide engaging the strands below the primary guide whereby projections on the secondary guide maintain the strands in spaced relation, a guard member on the secondary guide for maintaining the strands in the spaces provided by the projections, said secondary guide being movable downwardly from the primary guide and positioned to divert the strands through ninety degrees, relatively movable means supporting said secondary guide, rotatable and reciprocable traverse means adjacent a rotatable collector on which a package is being wound, means for reciprocating the traverse means for distributing the roving lengthwise of the package, and means reciprocating the secondary guide in synchronized relation with the reciprocations of the traverse means.

* * * * *